No. 882,239. PATENTED MAR. 17, 1908.
C. W. DUER.
AUTOMOBILE.
APPLICATION FILED DEC. 14, 1906.
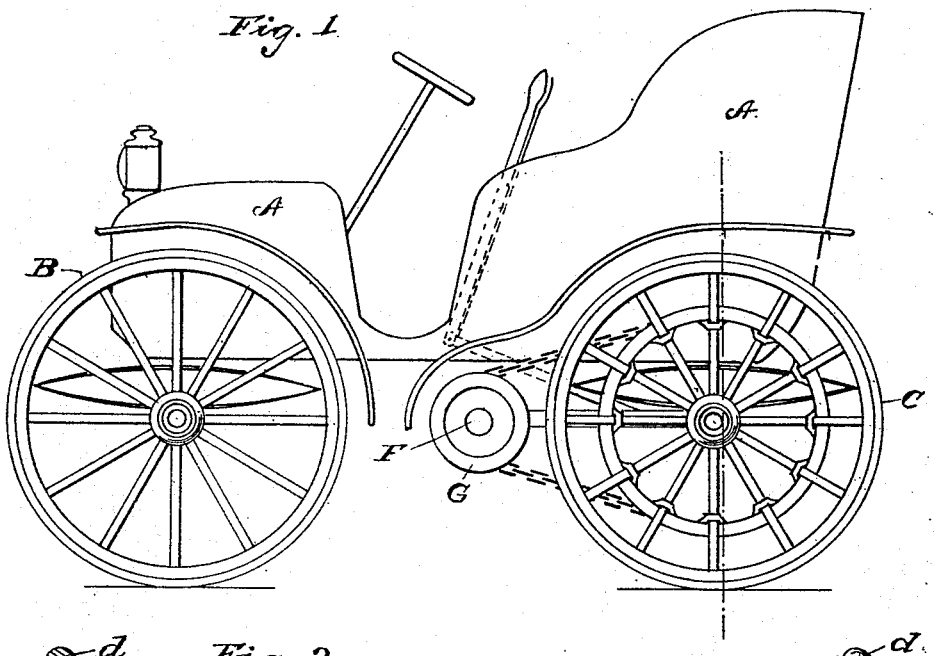
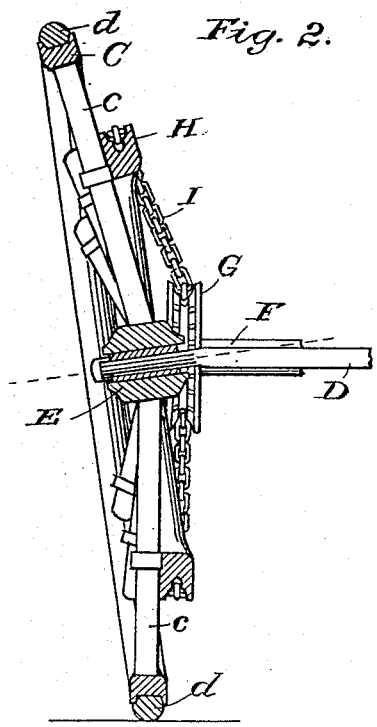 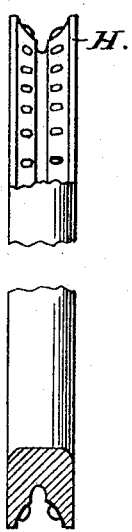 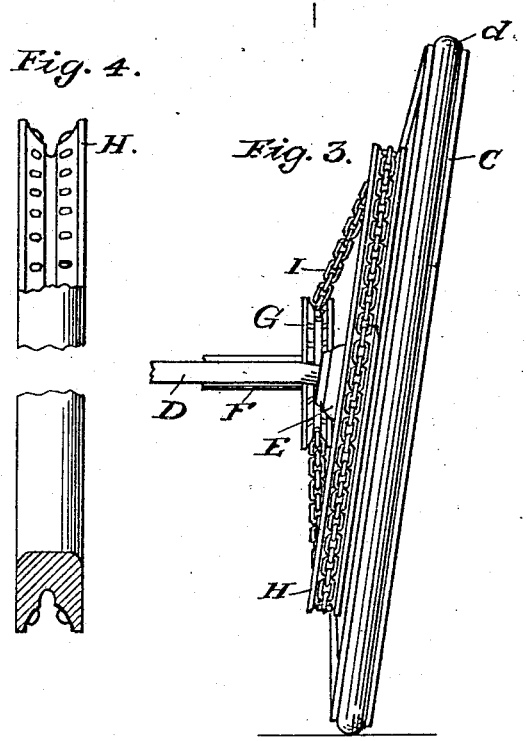
Witnesses
Inventor
Charles William Duer
By Joseph G. Parkinson
Att'y

UNITED STATES PATENT OFFICE.

CHARLES W. DUER, OF AUSTIN, ILLINOIS.

AUTOMOBILE.

No. 882,239.  Specification of Letters Patent.  Patented March 17, 1908.

Application filed December 14, 1906. Serial No. 347,871.

*To all whom it may concern:*

Be it known that I, CHARLES WILLIAM DUER, a citizen of the United States, residing at Austin, in the county of Cook and State of Illinois, have invented certain Improvements in Automobiles, of which the following is a specification.

This invention relates primarily to runabout automobiles built on the general plan of a buggy, with large wheels which may be of hickory, and with the body elevated high enough to pass over ordinary obstructions. The wheels it is proposed to make outwardly dished and to mount them on downwardly bent axle-journals in such manner that the tread will always come vertically beneath the hub and the lowermost spoke shall be absolutely perpendicular. Upon the inner sides of the rear wheels are secured large wild-cat sprocket wheels or rings affixed to the spokes and of any desired size not interfering with the tread thus giving requisite driving leverage to the traction wheels. Upon a counter-shaft are mounted two wild-cat sprocket pinions, but these are perpendicular with the shaft, while the sprocket-gears, it will be observed, are oblique thereto and to the rear axle. The pinions register, as near as may be, with their respective gears and are connected therewith by chain belts, so constructed as to be flexible in any direction and to twist and bend to accommodate the obliquity of the gears, while transmitting positive motion thereto.

In the drawings: Figure 1 is a side elevation of a runabout having my invention applied thereto; Fig. 2 is a vertical section of one of the rear wheels, showing also the appurtenant sprockets and chain, and illustrating the similar method of mounting the front wheels; Fig. 3 is a rear elevation of the opposite rear or traction wheel, with sprockets and chain; Fig. 4 is a detail of one of the sprocket-wheels.

Referring now to said drawings: A represents the body of the runabout or of any other automobile for which it is herein described as a prototype, that is any rigs, light or heavy, having high wheels and elevated body and employing the flexible chain drive which is the salient feature of my invention.

B indicates the outwardly dished front wheels, mounted in the same manner as the rear wheel shown in Fig. 2, but of course without sprocket wheels attached. The rear or traction wheels C are made of hickory in light runabouts but may be of other material in heavier machines. The spokes, c, are dished outwardly from the hub and support a grooved rim in which is set a solid rubber tire d which well serves for light machines.

The construction of both front and rear axles so far as the mounting of the carrying wheels is concerned, is the same as shown by the rear axle D in Fig. 2, that is the journals E at the outer ends are bent downward just sufficient to insure that the ground contacting tread of the wheels shall be perpendicularly beneath the hub, and that the spoke corresponding to this contact shall be at the time, independently and exclusively of all others, also perpendicular to the ground, so that inward strain in turning shall ever be resisted by every spoke except this one.

Upon a counter-shaft in front of the rear axle and indicated by letter F, are mounted two chain sprocket wheels or pinions G, of the type known nautically as wild-cat one near each end and both perpendicular to the shaft. Opposite these pinions chain sprocket gears or rings of similar type and of any desired diameter to insure the proper leverage, are secured to the spokes of the rear or traction wheels on the inner sides thereof, between the rim and hub but of course oblique to the planes of the pinions though in their revolution the lowest point will come into line with said pinions, the upper or highest point being widely divergent therefrom. Over the respective sprocket pinion and gear is thrown a flexible, twistable chain belt I connecting pinion G with gear H, and adapted to engage the teeth of both and drive the traction wheels positively, the counter shaft being of course driven by power from a suitable motor, as customary in automobiles. The chain herein shown is composed of oval links connected at right angles to each other, like an ordinary log or watch chain, and any chain constructed on that principle or analogous thereto will serve the purpose. Driving chains, such as used in bicycles, composed of flat, square links hinging on pivots parallel to their plane have no capability of twist and are impractical for the purpose, at least with oblique sprocket wheels that are much larger than the pinions and give appreciable driving leverage to the traction wheels.

Having thus described my invention, I wish it to be understood that I have described it as applied to a runabout for the reason that it is of extreme utility there, but without intending to limit it to automobiles of that type.

I claim:

1. In an automobile, the combination with a rear axle and obliquely set traction wheels thereon, of opposing chain sprockets set obliquely to each other to drive the traction wheels, and flexible and twistable chain belts uniting said sprockets.

2. The combination, in an automobile, of a non-rotating axle having downwardly bent journals, outwardly dished wheels mounted on said journals in such relation that the spokes in their revolution always come perpendicularly to the tread, a counter-shaft, chain wheels upon each end of the counter-shaft, chain gears secured to the dished wheels on the axle, obliquely to the chain wheels upon the counter-shaft, and flexible and twistable chain-belts connecting said chain wheels and gears.

3. The combination, in an automobile, of an axle having downwardly bent journals, outwardly dished traction wheels mounted on said journals in such relation that the spokes always come perpendicularly to the tread, a counter-shaft, wild-cat pulleys on the counter-shaft, oblique wild-cat gears secured to the spokes of said traction wheels between the rim and the hub, and open link flexible and twistable chain-belts connecting said pulleys and gears.

CHAS. W. DUER

Witnesses:
JOSEPH G. PARKINSON,
J. F. GANNON.